United States Patent
Muselli et al.

(10) Patent No.: US 7,497,648 B2
(45) Date of Patent: Mar. 3, 2009

(54) TOOL-HOLDER FOR MILLING MACHINES, A MILLING MACHINE AND A MILLING PROCEDURE

(75) Inventors: Roberto Muselli, Piacenza (IT); Maurizio Ferrari, Pizzighettone (IT)

(73) Assignee: JOBS S.p.A., Piacenza (IT)

( * ) Notice: Subject to any disclaimer, the term of this patent is extended or adjusted under 35 U.S.C. 154(b) by 0 days.

(21) Appl. No.: 11/634,939

(22) Filed: Dec. 7, 2006

(65) Prior Publication Data
US 2007/0127997 A1 Jun. 7, 2007

(30) Foreign Application Priority Data
Dec. 7, 2005 (IT) .................. BO2005A0752

(51) Int. Cl.
B23C 3/00 (2006.01)
(52) U.S. Cl. ...................................... 409/137
(58) Field of Classification Search ............. 409/132, 409/137, 138, 140, 144, 232, 180, 186, 210
See application file for complete search history.

(56) References Cited

U.S. PATENT DOCUMENTS

| | | | | |
|---|---|---|---|---|
| 4,515,505 A | * | 5/1985 | Frisbie et al. | 409/163 |
| 4,530,627 A | * | 7/1985 | Kosmowski | 409/80 |
| 4,606,696 A | * | 8/1986 | Slocum | 414/744.2 |
| 5,199,830 A | * | 4/1993 | Otani et al. | 409/137 |
| 5,539,966 A | * | 7/1996 | Aufiero | 29/26 A |
| 5,947,661 A | * | 9/1999 | Sugata | 409/131 |
| 6,264,590 B1 | * | 7/2001 | Ferrari | 409/137 |
| 6,722,827 B1 | * | 4/2004 | Anderson | 409/233 |
| 6,979,156 B2 | * | 12/2005 | Olsson et al. | 409/233 |
| 7,128,506 B2 | * | 10/2006 | Ferrari et al. | 409/201 |
| 7,134,817 B2 | * | 11/2006 | Kado et al. | 409/137 |
| 7,220,088 B2 | * | 5/2007 | Ferrari et al. | 409/204 |
| 2007/0216113 A1 | * | 9/2007 | Schuster et al. | 279/2.08 |

FOREIGN PATENT DOCUMENTS

| | | |
|---|---|---|
| EP | 1 584 389 A | 10/2005 |
| GB | 2 363 861 A | 1/2002 |
| WO | WO 2005/097384 | 10/2005 |

\* cited by examiner

Primary Examiner—Dana Ross
(74) Attorney, Agent, or Firm—Timothy J. Klima (57) ABSTRACT

A tool-holder for a milling machine is composed of a first rotating portion with a coupler attachable to a spindle drive shaft of the machine, a second rotating portion turning as one with the first portion and equipped with a chuck to hold a tool, and a mechanism designed to detect undulations on a surface being milled. The second rotating portion is capable of axial movement relative to the first rotating portion, so that when the tool-holder is traversed along a prescribed trajectory referable to a nominal surface, the undulations on the actual surface of the panel and the extent of their deviation from the nominal surface can be sensed and quantified through the agency of detection mechanism, and a corresponding axial movement induced in the second portion of the tool-holder to compensate the variation and maintain a constant milling depth, thereby improving the quality of finish-milling operations on technological materials such as panels of carbon fiber composite.

15 Claims, 6 Drawing Sheets

TOOL-HOLDER FOR MILLING MACHINES, A MILLING MACHINE AND A MILLING PROCEDURE

BACKGROUND OF THE INVENTION

The present invention relates to a tool-holder for milling machines, to a milling machine, and to a milling procedure The tool-holder, machine and procedure according to the present invention allow milling, bevel and radius cuts or other machining passes to be made automatically and to extremely close tolerances, even in situations where the exact geometry of the surface presented by the work is not known. More particularly, the invention will allow controlled bevel/radius passes to be performed on corner edges that have been generated previously by milling to known geometrical parameters, but are referable only to a surface of which the position cannot be determined by machine references.

The invention finds application preferably in the art field of CNC multi-axis machine tools as used in the aircraft industry, typically, to carry out milling, beveling and radiusing operations on the panels of wing structures and fuselage sections. This said, the invention also finds application to advantage in other sectors of industry, such as vehicle manufacturing.

In aircraft building, conventionally, openings have to be cut in fuselage panels to provide the surrounds for windows and for cargo doors. These openings are produced by a milling operation that involves piercing the panel and cutting out a hole of which the shape will match the outline of the window or door to be installed.

The subsequent installation of the window or door must be accomplished in such a way as to guarantee smooth continuity of the surface presented by the window and the surrounding panel, minimizing any bumps or ridges that could induce vortical airflows and undesirably increase the overall aerodynamic resistance of the aircraft. For example, the door seal must close flush with the panel of the outer skin, and accordingly, when the opening is cut, an edge or rim is generated where the outer surface of the panel meets the face of the cut, which will be beveled or radiused to accept the door seal. The width of the bevel must remain constant around the entire peripheral outline of the opening destined to accommodate the door or window, in such a way that the seal, which is of substantially constant thickness, will lie flush with the panels at any given point.

To produce the bevel, multi-axis milling machines of prior art design are programmed to follow the contour presented, for example, by the peripheral edge of the door opening on the curved surface of the panel in which the opening is cut. Knowledge of the panel surface is acquired by the multi-axis machine in the form of a mathematical equation that represents an ideal or nominal surface, and as such does not correspond exactly to the actual surface of the panel. In reality, whether a flat surface, as along segments of the wings, or curved as on the fuselage, the actual surface will always deviate from the nominal surface. Physically, the deviation is manifested as a series of undulations straying positively or negatively from the nominal surface and deriving from the process by which the panels are manufactured.

Consequently, whilst the motion of the toolhead on the multi-axis machine follows the programmed line of the nominal surface, the tool engages the actual surface, producing a bevel or a radius or a groove of depth that is different to the programmed depth and will not be constant, determined as it is by undulations of unknown value encountered along the machining path.

Already a factor affecting the preparation of aluminum alloy panels hitherto, the impact of this deviation is still more significant today in the case of panels made from composite materials such as carbon fiber. In effect, an error in machining depth on panels made of carbon fiber composite is particularly hazardous, as there is risk that the fibers can be broken, as well as the matrix, and the structural integrity of the panel jeopardized as a result.

Accordingly, the standard practice when forming bevels on carbon fiber composite is to use a hand tool with a depth stop, offered in contact to the irregular surface and rigidly associated with a blade that engages the corner edge being beveled. The operator thus slides the depth stop along the surface, while removing material from the corner edge with the blade to form the bevel or radius.

The applicant finds that the prior art in this field could be improved from various standpoints.

In particular, multi-axis CNC machines reflecting the prior art are not able to mill, bevel or radius automatically at constant depth while compensating for irregularities in a reference surface.

Performing such operations by hand is a laborious and slow process, and no longer compatible with the production tempos typical of present-day industry. Given the delicate nature of the work, moreover, especially when using fiber-reinforced composites, it must be entrusted to operatives in possession of particular skills, but prone nonetheless to human error. In addition, the carbon dust generated by cutting and machining composite materials of the type in question is most certainly harmful to any individual who may be performing these operations by hand.

The object of the present invention is to design a tool-holder for milling machines, also a milling machine and a milling process, such as will be substantially devoid of the drawbacks mentioned above.

In particular, the object of the invention is to provide a tool-holder, a machine and a process that will allow controlled milling passes to be carried out automatically on actual surfaces occupying any given position with respect to a nominal surface programmed into the machine.

Similarly, the object of the present invention is to provide a tool-holder, a machine and a process that will sink grooves, bevel or radius edges and remove burrs or flashes automatically, while also maintaining a constant machining depth relative to the actual surface of the work, especially in the case of pieces fashioned from composite material, preferably containing carbon.

A further object of the invention is to provide a tool-holder that can be utilized in conjunction with any numerically controlled machine, and in particular with multi-axis machine tools.

SUMMARY OF THE INVENTION

The stated objects are duly realized according to the present invention in a tool-holder for milling machines, comprising a first rotating portion equipped with a coupler attachable to a drive take-off of a milling machine, a second rotating portion turning as one with the first portion and equipped with a chuck to which a tool can be clamped, and means by which to detect undulations presented by an actual surface being milled, the second rotating portion being capable of axial movement relative to the first rotating portion in such a way as to follow the undulations and maintain a constant milling depth.

The invention relates similarly to a milling machine equipped with a tool-holder as disclosed herein, and to a relative milling procedure that includes the steps of causing a first rotating portion of a tool-holder, equipped with a coupler attachable to a drive take-off of a milling machine, to move along a predetermined trajectory referred to a nominal surface, and using detection means to sense undulations presented by the actual surface being milled and consisting in deviations of the actual surface from the nominal surface. To advantage, the procedure includes the further step of inducing axial movement in a second rotating portion of the tool holder, turning as one with the first rotating portion, displaceable axially relative to the selfsame first portion and carrying a tool, in such a way as to follow the undulations of the surface and maintain a constant depth throughout the milling operation.

BRIEF DESCRIPTION OF THE DRAWINGS

The invention will now be described in detail, by way of example, with the aid of the accompanying drawings, in which.

DESCRIPTION OF THE PREFERRED EMBODIMENTS

With reference to the accompanying drawings, numeral 1 denotes a tool-holder, in its entirety. The tool-holder 1 is mounted preferably to a multi-axis machine tool with numerical control, described below in general terms only, being of conventional type, and not illustrated in the drawings.

The machine tool generally comprises a bed on which a spindlehead is mounted, carrying the tool-holder 1, with freedom of movement relative to the selfsame bed along a plurality of positioning axes. The spindlehead and tool-holder 1 are positionable on the various axes by drive means connected to a processing and control unit and serving also to govern the rotation of the tool about a relative machining axis, on the basis of data programmed into the control unit. The spindlehead comprises a support component to which a chuck is mounted, the tool-holder 1 being associated removably with the chuck. The spindle chuck is rotatable thus about a relative machining axis and set in rotation by suitable drive means, not indicated, in such a way that a milling cutter type tool U carried by the tool-holder 1 can be set in rotation and perform the machining operation.

Figure 3A:
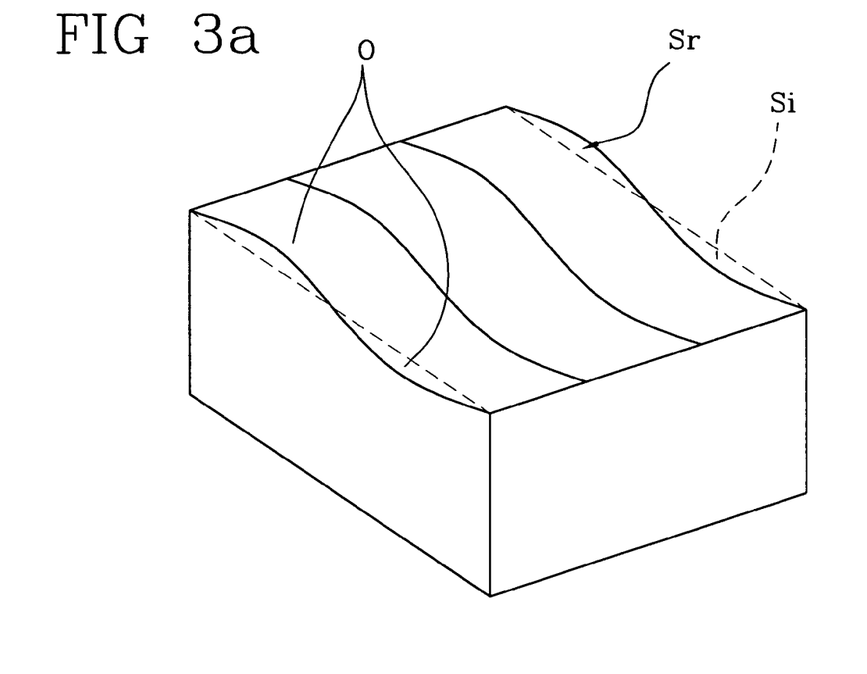
FIGS. 3a and 3b are perspective views of milling workpieces presenting a reference surface with undulations.
Figure 3B:
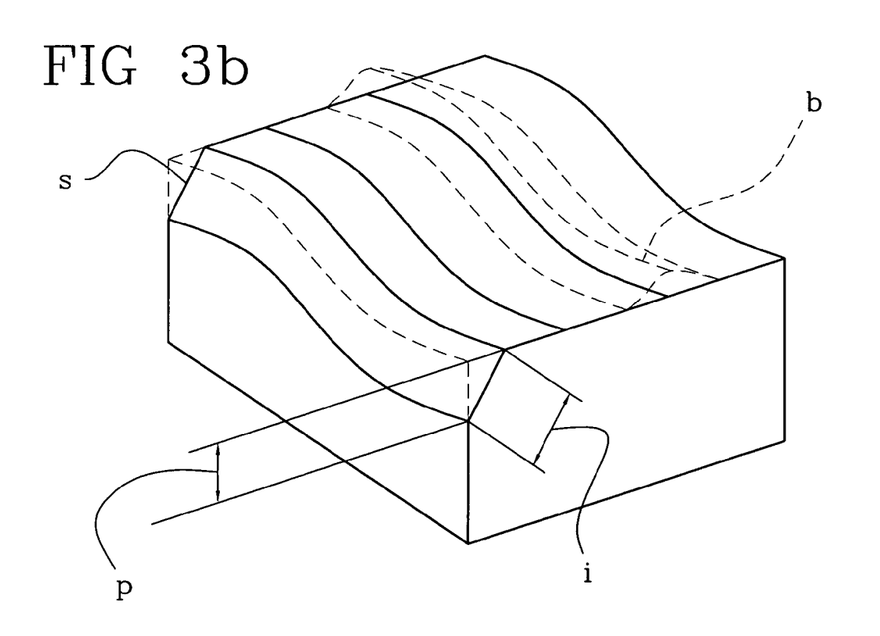

The generic term "milling" is used in the present specification to indicate a mechanical machining operation in which the rotation of a milling tool about its longitudinal axis X is accompanied by a feed motion of the tool-holder along a direction extending skew relative to the longitudinal axis X, and generally transverse to this same axis X. The feed motion is induced along an actual surface 'Sr' on or in which the cut is to be made, in such a way as to obtain, for example, a groove, a radius 'r' or a bevel 's' on an already formed corner edge, or to remove a burr or flash 'b' (FIG. 3b).

Figure 1:
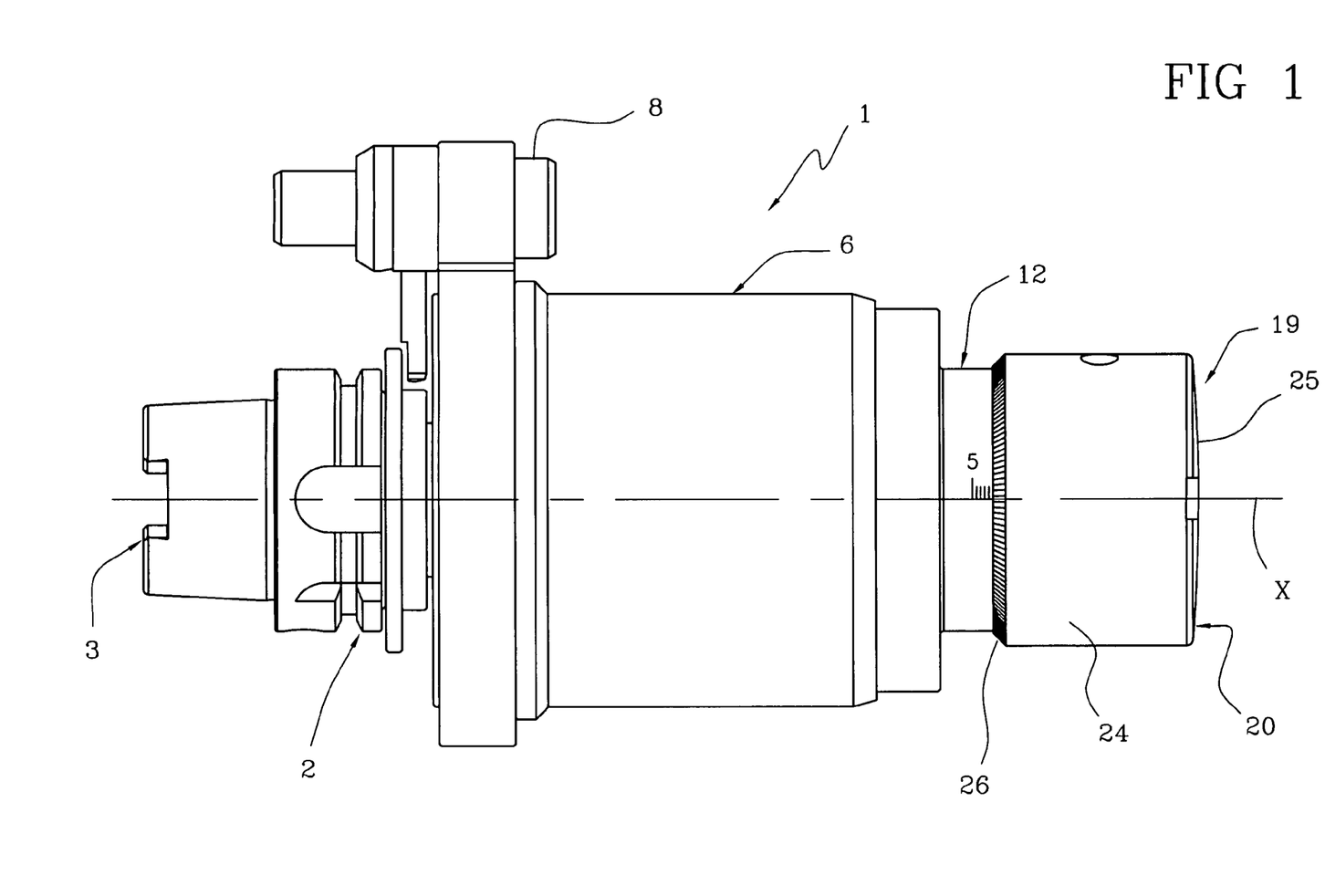
FIG. 1 illustrates a tool-holder according to the present invention, viewed from the side.
Figure 2:
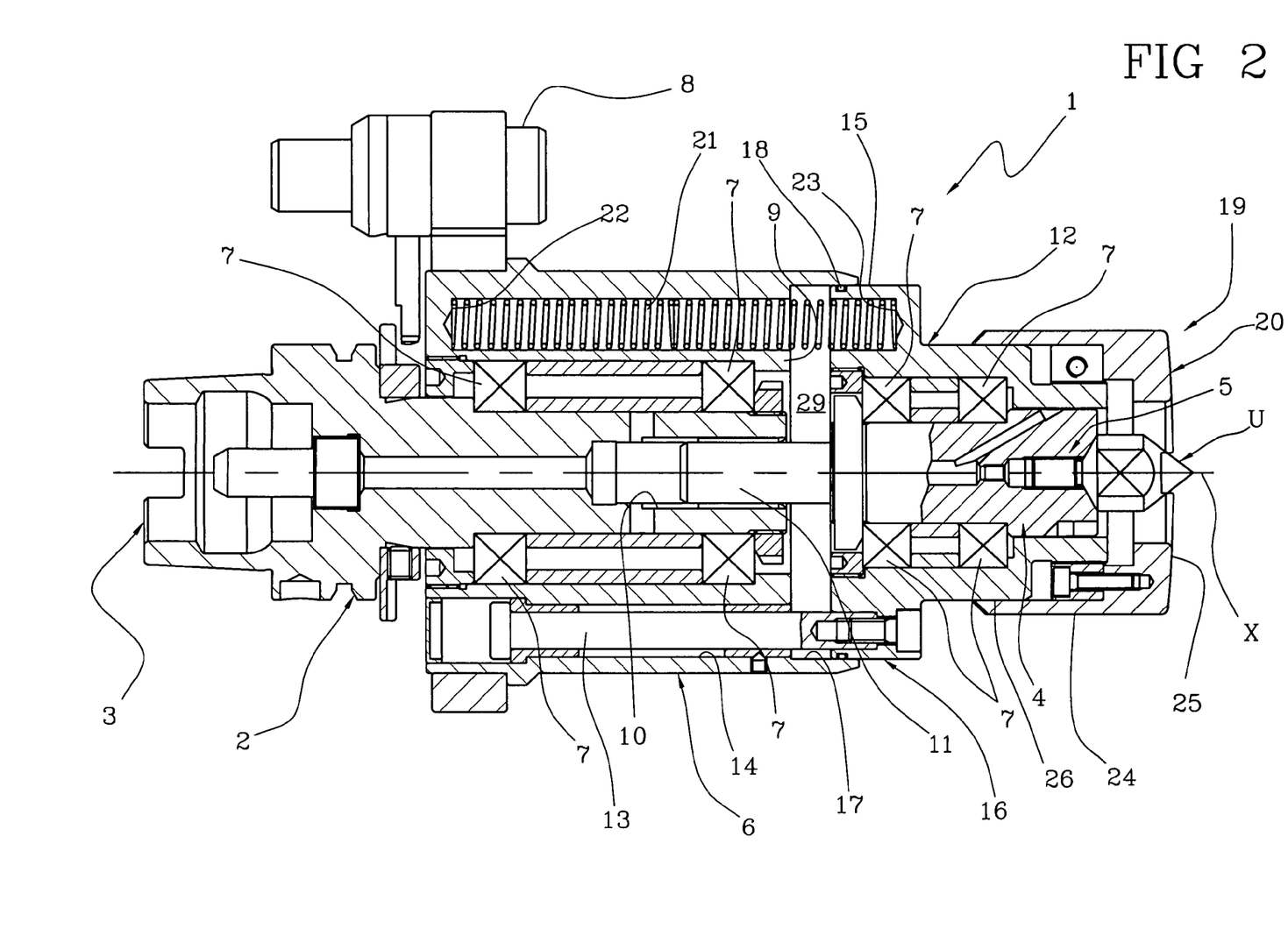
FIG. 2 is a longitudinal section through the tool-holder of FIG. 1.

With reference to FIG. 2, in particular, the tool-holder 1 comprises a first rotating portion 2 with a coupler 3 attachable to the drive take-off of a conventional milling centre (not illustrated) such as will generate the power needed in order to set a milling tool U in rotation about a machining axis X. A second portion 4 of the tool-holder 1, aligned on the machining axis X, is set in rotation together with the first portion 2 and capable also of axial movement relative to the first portion 2. The second portion 4 terminates in a chuck 5 by which the milling tool U is received and clamped.

In the preferred embodiment of the tool holder described and illustrated, the first rotating portion 2 occupies a first housing 6, with which it is also coupled rotatably by way of bearings 7. The first housing 6 is restrained axially, relative to the first rotating portion 2, and furnished with an appendage 8 by way of which it is connected rigidly to the toolhead of the machine. Accordingly, the first housing 6 remains anchored fixedly to the toolhead, whilst the first rotating portion 2 is coupled to the drive take-off and turns within the housing 6.

An outer end 9 of the first rotating portion 2, remote from the end with the coupler 3, presents an axial bore 10 slidably accommodating a shaft 11 projecting from the second rotating portion 4. The bore 10 and the shaft 11 are shaped in such a way as to transmit rotation from the first portion 2 to the second portion 4 and to the tool U.

The second rotating portion 4 occupies a second housing 12 with which it is coupled rotatably, for example by way of bearings 7. The second housing 12 is disallowed angular movement in relation to the first housing 6, while capable of axial movement relative to the selfsame first housing 6. Thus, as the second rotating portion 4 turns within the second housing 12, the housing itself is able also to shift axially in relation to the first housing 6 and to the first rotating portion 2.

In the example of FIG. 2, the first housing 6 and the second housing 12 are restrained angularly one relative to another by guide rods 13 (one only of which is visible in the drawings) associated rigidly with the second housing 12 and slidable in sockets 14 afforded by the first housing 6, which extend parallel to the machining axis X. The guide rods 13 also ensure that the two housings 6 and 12 are maintained in coaxial alignment and therefore in faultless mutually sliding association. Also, the second housing 12 is accommodated partly within the first housing 6, telescopically. More exactly, a radially peripheral surface 15 presented by one end 16 of the second housing 12, near the shaft 11 of the second rotating portion 4, will be breasted in contact with an inner surface 17 of the first housing 6, preferably together with interposed seal means 18 such as a ring.

To advantage, the tool-holder 1 is also equipped with means 19 by which to detect undulations or irregularities 'O' in the actual surface 'Sr' being milled, in such a way that the axial movement of the second rotating portion 4 relative to the first rotating portion 2 will allow the tool to follow the undulations 'O' and maintain a constant milling depth.

It happens indeed that during milling operations, which may involve sinking a groove on a surface, or forming a bevel 's' or a radius 'r' on corner edges generated by previous cuts, or removing burrs 'b' left by other machining operations, the toolhead of the milling machine and the first portion 2 of the tool-holder 1 rigidly associated with the toolhead are caused to move across the actual surface 'Sr' being milled, following a predetermined trajectory referable to a corresponding nominal surface 'Si' (the flat surface of FIG. 3a; this same surface 'Si' is deliberately omitted from FIG. 3b for the sake of clarity), that is to say, a surface devoid of undulations and irregularities. In the case of machines with numerical control, the mathematical equation for the nominal surface 'Si' is programmed into the control unit, which will then pilot the operation of suitable actuators to shift the head as mentioned above.

Accordingly, the detection means 19 will detect the undulations 'O' in the actual surface 'Sr' being milled (the undulating surface shown in FIGS. 3a and 3b by solid lines), which deviates from the nominal surface 'Si' (the flat surface shown by phantom lines in FIG. 3a), and allow the second portion 4 of the tool-holder 1, rotating together with the first portion 2, to shift axially with respect to this same first rotating portion 2 and follow the undulations 'O', maintaining a constant milling depth as the toolhead advances bodily over the actual surface. Given that in the case of a bevel 's' (FIG. 3b), the angle of the bevel is constant, a constant cutting depth 'p' will produce a constant width 'l' of the bevel. In the case of deburring, a pass executed at constant depth will ensure that the burr 'b' (FIG. 3b) is removed accurately, and without marking the remainder of the material.

In the preferred embodiment illustrated, the detection means 19 are of mechanical type, and are one and the same as the means by which the second rotating portion 4 is displaced mechanically in relation to the first portion 2.

In particular, the detection means 19 comprise a follower 20 capable of axial movement in relation to the first rotating portion 2 and together with the second rotating portion 4, and at least one resilient element 21 interposed between the second rotating portion 4 and the first rotating portion 2 in such a manner as to bias the second rotating portion 4 toward an extended position of the tool-holder 1, against a reaction force exerted on the follower 20 by the actual surface 'Sr' during the milling operation. In the example of the drawings, accordingly, where the follower 20 is associated rigidly and axially with the second rotating portion 4, it is the undulations 'O' themselves that impinge on the follower 20 and induce the displacement of the second portion 4 against the action of the resilient element 21.

The resilient element 21 consists preferably in a coil spring located between the first housing 6 and the second housing 12 and disposed parallel to the longitudinal axis X. More exactly, as illustrated in FIG. 2, the tool-holder 1 would incorporate a plurality of coil springs 21, of which one only is visible, arranged around the longitudinal machining axis X of the chuck 5 and around the axial bore 10 of the first rotating portion 2. Each spring 21 is presents a first end registering against a seat 22 afforded by the first housing 6 and a second end, opposite to the first end, registering against a seat 23 afforded by the second housing 12.

Alternatively, the resilient element 21 might consist in a cushion of fluid, typically a gas such as air, incorporated directly between the first housing 6 and the second housing 12 or contained in a pneumatic cylinder, not illustrated, interposed between the two housings 6 and 12 in the same way as for the coil spring. The firmness offered by the fluid cushion is set by varying the pressure of the fluid.

The follower 20 is rigidly associated with the second housing 12, so that axial movement induced by contact with the surface 'Sr' being milled can be transmitted through the bearings 7 to the second rotating portion 4. In the example of the drawings, the follower 20 appears as a cylindrical element 24 lockable to the second housing 12 and presenting an active surface 25 that extends around the spindle chuck 5 and encircles the tool 'U'. In the course of machining, the active surface 25 rests upon and slides over the actual surface 'Sr' being milled, as the toolhead of the machine moves in a direction perpendicular to the axis 'X' of the spindle chuck 5. The active surface 25 is pressed against the actual surface 'Sr' so as to give the tool 'U' a certain preload dependent on the predetermined distance at which the tool-holder is positioned relative to the nominal surface 'Si', as well as on the properties of the single coil spring 21 and on the number of springs installed.

Figures 4, 5:
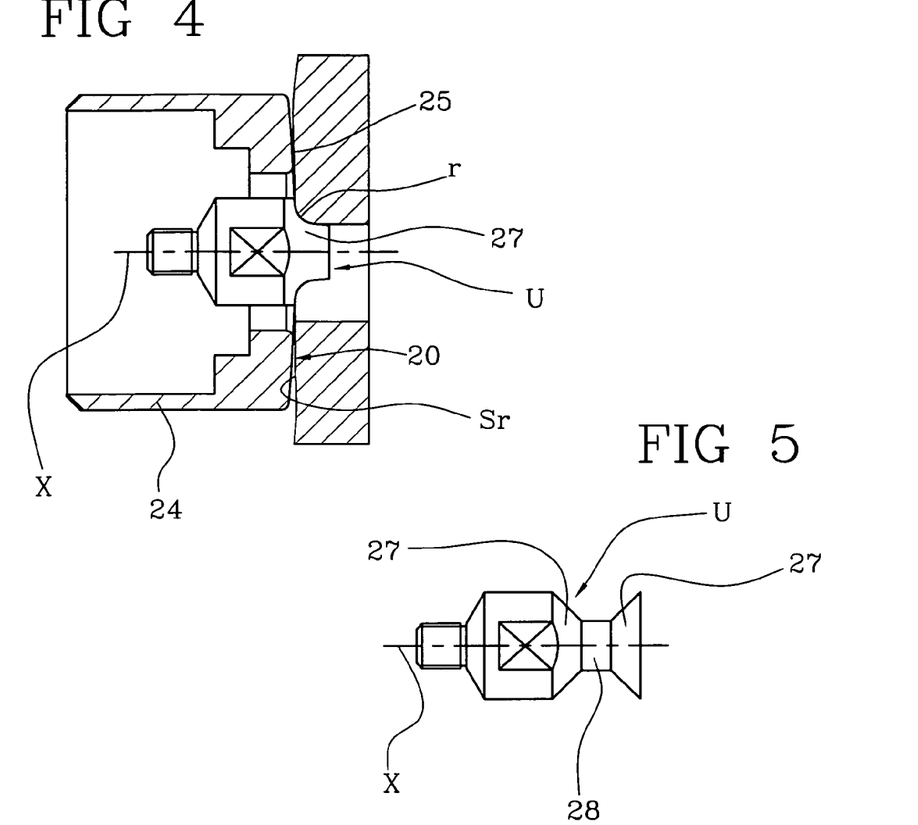
FIGS. 4 to 10 are schematic illustrations of various operating steps performed respectively with different tools attachable to the holder of the present invention.

To advantage, the active surface 25 is adjustable axially, relative to the chuck 5 and to the tool U, so that the milling depth can be set as needed. To this end, the cylindrical element 24 can be fitted to the second housing 12, for example, by way of a micrometrically adjustable screw collar 26.

Where a bevel (FIG. 3b) needs to be milled at constant depth, the tool employed will be conical (as in FIG. 2) or possibly frustoconical (not illustrated) and must project beyond the active surface 25 of the follower 20 by a predetermined distance, set with the screw collar 26. To form a radius (FIG. 4), similarly, the milling tool U will project beyond the active surface 25.

Figure 6:
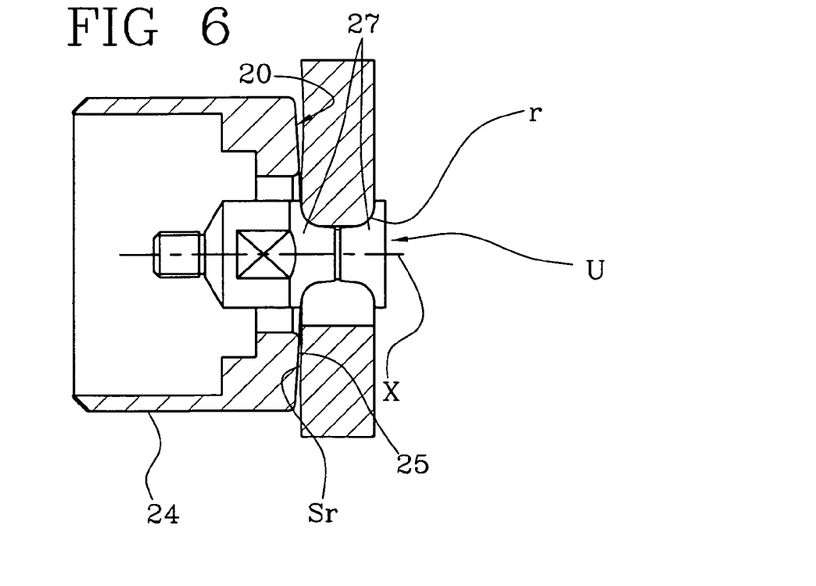
Figure 7:
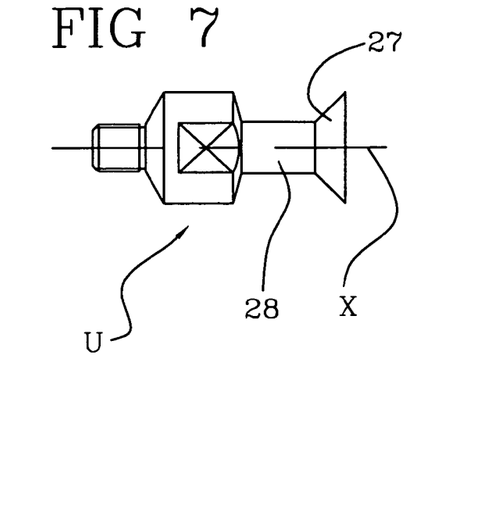
Figure 8:
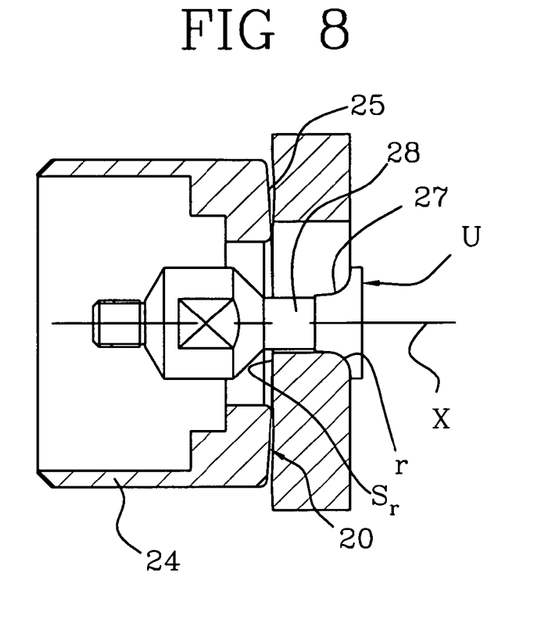

If the bevel or radius is milled on one edge of a thin panel, it may be necessary to bevel the corner edge on the side of the panel opposite from the undulated surface 'Sr' using this same surface as a positional reference. In this instance, the tool U utilized will present an inverted profile, with the frustoconical cutting face 27 tapering toward the tool-holder 1 and toward the shank 28 by which the tool is connected to the chuck 5 (FIGS. 7 and 8). The principle of operation remains unchanged, in that the follower 20 still engages the undulating or irregular actual surface 'Sr'. Finally, these same beveling and radiusing cuts can also be made with a milling tool (FIGS. 5 and 6) having two opposed cutting faces 27 tapering one toward the other, so that both corner edges of the panel can be machined simultaneously.

Figure 9:
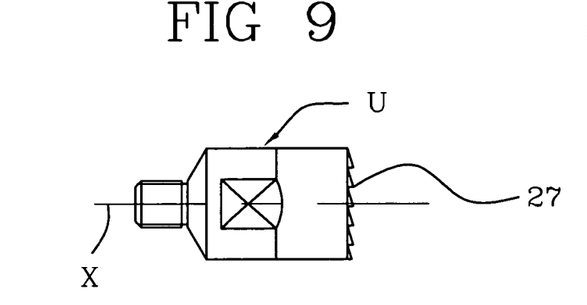

If on the other hand the purpose of the machining pass is to remove excess material from the actual surface 'Sr', typically resin, as in the case of flashes left by molding processes (FIG. 3b), the tool U will present a substantially flat cutting face 27 set flush with the active surface 25 of the follower 20 (FIG. 9).

Figure 10:
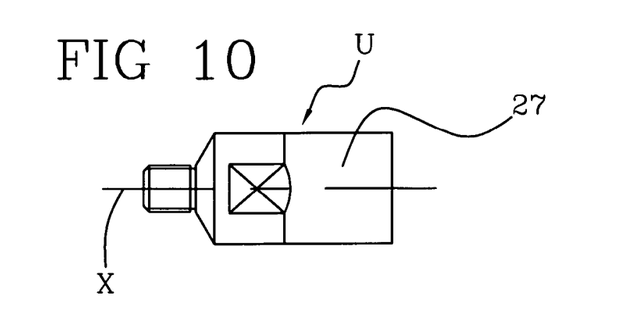

In the case of a groove, finally, this would be milled using a tool U with a cylindrical cutting face 27 projecting beyond the active surface 25 of the follower 20 (FIG. 10).

Figure 11:
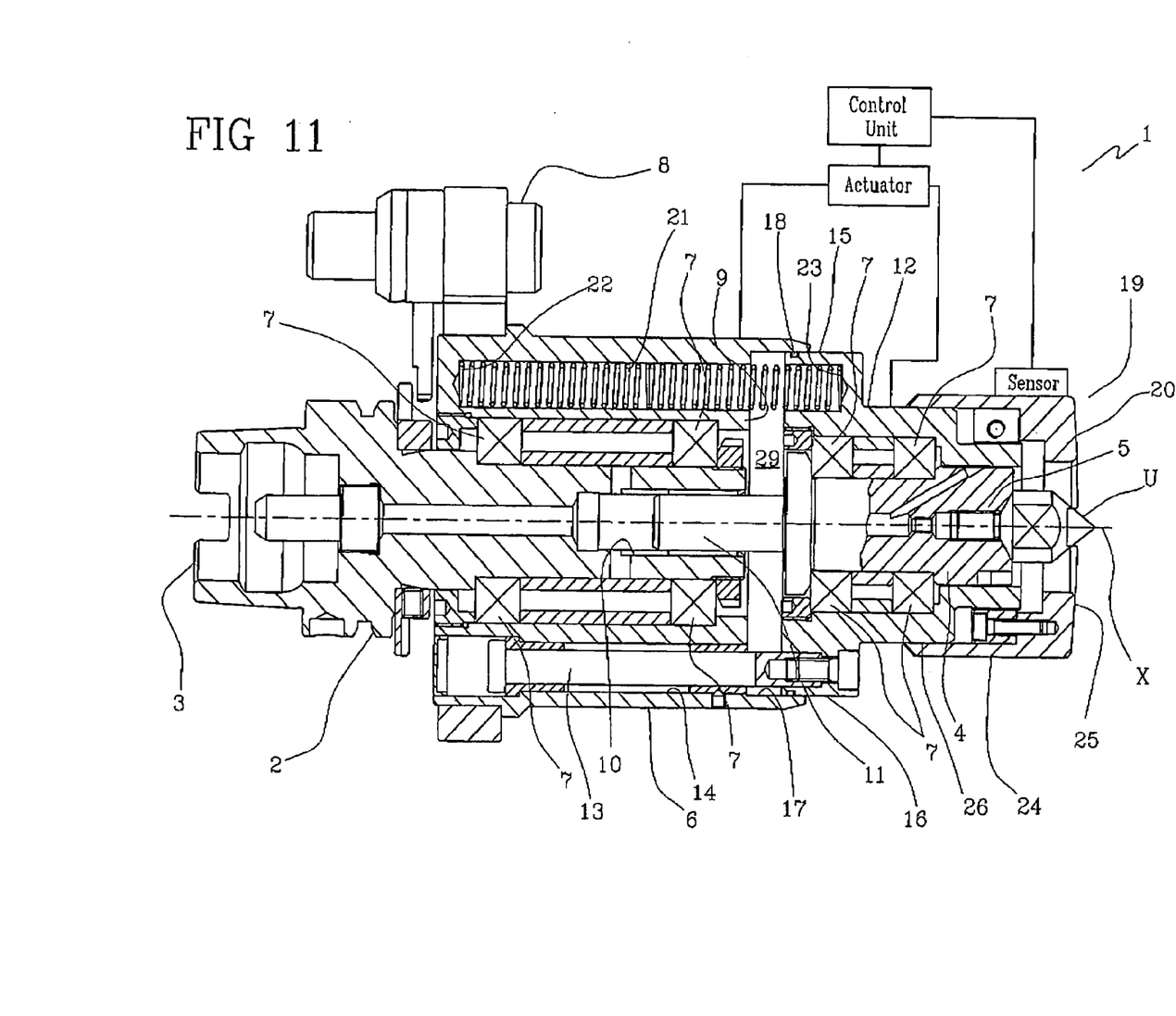
FIG. 11 is a longitudinal section through an alternative embodiment of a tool-holder according to the present invention.

Alternatively, and in accordance with a further embodiment illustrated in FIG. 11, the depth control might be electronic. In other words, the means 19 by which to detect the undulations 'O' on the surface could comprise at least one sensor, optical for example, in which case the tool-holder would also incorporate a control unit, connected to the sensor, and an actuator interposed between the first and second rotating portions 2 and 4, such as will displace the second rotating portion 4 axially in relation to the first portion 2 when piloted by the control unit in response to signals received from the sensor. Likewise in this instance, the sensor will be mounted to the tool-holder 1 in such a way as to precede the tool U along the milling pass and relay information electronically to the control unit indicating its axial movements, which are then replicated after a programmed delay by the second rotating portion 4 of the tool-holder 1.

The milling procedure implemented by way of a tool-holder 1 as described above is applicable preferably to the machining of pieces manufactured from composite materials that consist of a matrix and, embedded in the matrix, fibers preferably of carbon based composition. The procedure is applied advantageously to milling operations carried out on carbon fiber panels, in particular. In effect, by reason of the fibers being embedded in the panel, maximum care must be taken over the milling depth, in order to ensure that fibers will not be cut and the panel thus rendered unfit for use.

Accordingly, the tool-holder to which the present invention relates will operate advantageously in conjunction with an extractor, mounted externally of or incorporated into the toolhead, or into the holder itself, to guarantee the continuous removal of carbon dust, which is not only a health hazard to operators but also abrasive and deleterious to machinery and equipment. The tool-holder 1 will also be pressurized internally so as to prevent any ingress of abrasive particles, for example via the annular area of mutual contact between the first housing 6 and the second housing 12. In particular, the chamber 29 created between the first and second rotating portions 2 and 4 would be maintained at an overpressure sufficient to prevent the carbon dust entering past the seal 18.

The objects stated at the outset are overcome by the present invention.

First and foremost, the tool-holder, the milling machine and the milling procedure according to the present invention will allow machining passes to be made automatically and at a controlled depth in relation to a reference surface on which a locating face of the tool-holder is caused to slide, even when the surface in question is irregular and its position is unknown and variable in relation to the machine references.

Whilst the tool-holder, the milling machine and the milling procedure according to the present invention can be utilized to process any material suitable for machining, the stated advantage is especially evident in the case of composites such as carbon fiber, given that the process by which composites are manufactured involves generating surfaces that can differ from the ideal geometry determined at the design stage. Moreover, an error committed when machining a part made of composite material can cause some of the reinforcing fibers to break and lead ultimately to structural failure of the part.

With the machining process automated, moreover, rates of production can be increased in comparison to those obtainable with manual procedures, while also avoiding the exposure of operators to direct contact with hazardous carbon dust generated by milling.

Finally, the tool-holder disclosed is able to perform machining operations at controlled depth using standard tools and can be mounted to milling machines of conventional design.

What is claimed is:

1. A tool-holder for milling machines, comprising:
   a first rotating portion equipped with a coupler attachable to a drive take-off of a milling machine;
   a second rotating portion turning as one with the first portion and including a spindle chuck to which a tool can be clamped;
   a detector to detect undulations presented by an actual surface being milled,
   wherein the second rotating portion is axially moveable relative to the first rotating portion in relation to the undulations detected by the detector, so as to follow the undulations and maintain a constant milling depth.

2. A tool-holder as in claim 1, wherein the detector comprises a follower axially moveable relative to the first rotating portion.

3. A tool-holder as in claim 2, wherein the follower is axially moveable as one with the second rotating portion.

4. A tool-holder as in claim 3, comprising at least one axially resilient element interposed between the second rotating portion and the first rotating portion, by which the second rotating portion is biased toward an extended position of the tool-holder against a reaction force exerted by the actual surface on the follower during the milling operation.

5. A tool-holder as in claim 4, comprising a first housing coupled rotatably with the first rotating portion and connected rigidly to the milling machine, also a second housing coupled rotatably to the second rotating portion, wherein the at least one resilient element is interposed between the first housing and the second housing.

6. A tool-holder as in claim 5, wherein the second housing is angularly fixed and axially movable relative to the first housing.

7. A tool-holder as in claim 5, wherein the follower is rigidly associated with the second housing.

8. A tool-holder as in claim 5, wherein the follower comprises a cylindrical element lockable to the second housing, and having an active surface positioned around the chuck so as to encircle the tool, and is slideable with respect to the actual surface being milled.

9. A tool-holder as in claim 8, wherein the active surface is positionable axially relative to the chuck, so as to allow adjustment of the milling depth.

10. A tool-holder as in claim 9, wherein the cylindrical element is positioned on the second housing with a micrometric screw collar.

11. A tool-holder as in claim 4, wherein the at least one resilient element is a coil spring.

12. A tool-holder as in claim 4, wherein the at least one resilient element is one of a plurality of coil springs arranged around the machining axis of the spindle chuck.

13. A tool-holder as in claim 4, wherein the at least one resilient element is a gas cushion.

14. A tool-holder as in claim 1, wherein the detector comprises at least one sensor, a control unit associated with the tool-holder and connected to the sensor, and an actuator, interposed between the first and second rotating portions of the tool-holder, by which the second rotating portion can be displaced axially relative to the first portion via the control unit in response to information received from the sensor.

15. A tool-holder as in claim 14, wherein the sensor is an optical sensor.

* * * * *